April 6, 1926.
V. ALTMAN
VEHICLE SIGNAL
Filed March 16, 1925
1,579,853
2 Sheets-Sheet 1
Fig. 1
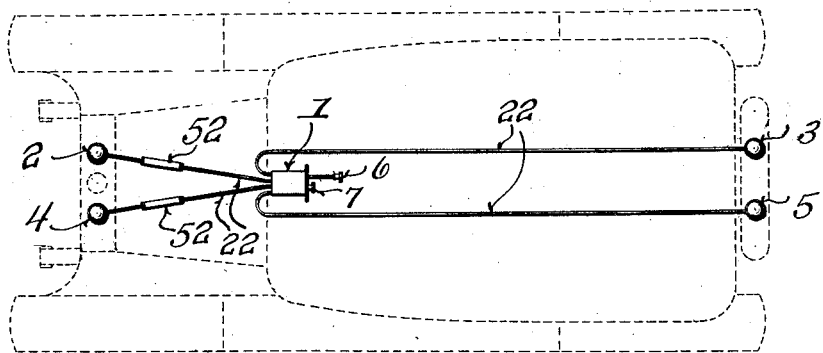
Fig. 2
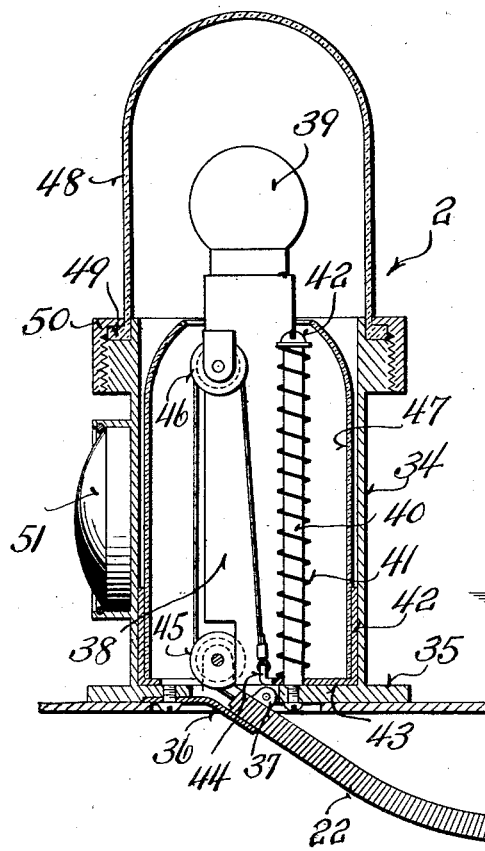
Fig. 7
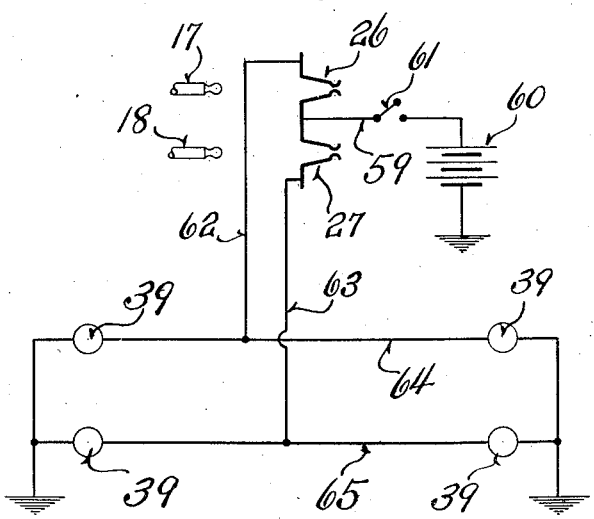
Inventor:
Vladislav Altman

April 6, 1926.  1,579,853
V. ALTMAN
VEHICLE SIGNAL
Filed March 16, 1925  2 Sheets-Sheet 2
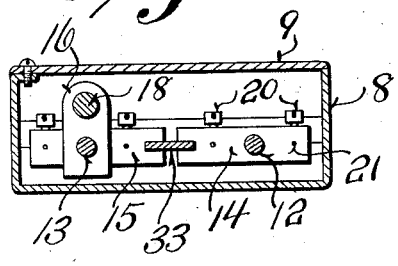
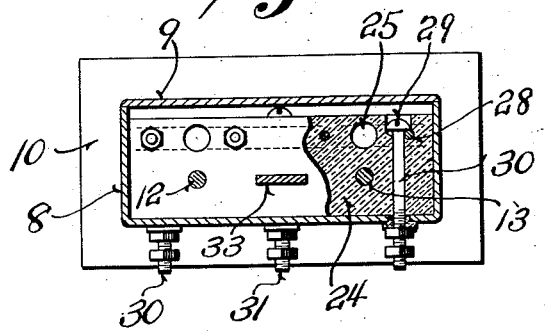
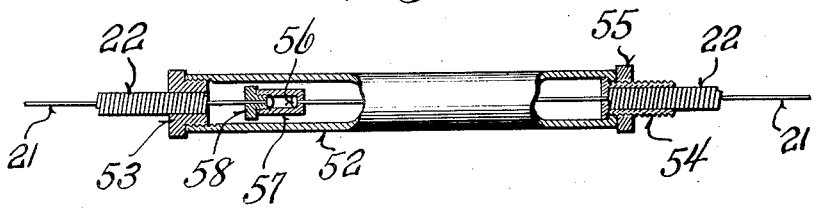
Inventor:
Vladislav Altman
By
Attorneys Patented Apr. 6, 1926.

1,579,853

UNITED STATES PATENT OFFICE.

VLADISLAV ALTMAN, OF RACINE, WISCONSIN.

VEHICLE SIGNAL.

Application filed March 16, 1925. Serial No. 15,976.

*To all whom it may concern:*

Be it known that I, VLADISLAV ALTMAN, a citizen of the United States, and resident of Racine, in the county of Racine and State of Wisconsin, have invented certain new and useful Improvements in Vehicle Signals; and I do hereby declare that the following is a full, clear, and exact description thereof.

This invention relates to vehicle signals, and is particularly directed to a signal system adapted for use on automobiles.

In signals for automobiles as heretofore constructed, various expedients have been employed which are more or less particularly adapted to certain makes of cars.

This invention is designed to provide a signal system which is suitable for any type of car, and which is thus standardized so that it may be readily applied to existing types of cars without requiring extensive alterations.

Further objects are to provide a signal system in which signals are provided at the front and rear of the automobile to indicate the direction of turn either during day or night travel, and to so organize the signal system that during night travel or whenever needed, lights may be automatically turned on to act in conjunction with colored members, both in front and at the rear of the machine to indicate the intention of the driver.

More specifically this invention has for its object to provide a signal system which is controlled from the dash, and which is provided with flexible members and electrical circuits, which may be easily extended to the front and rear of any type of machine, and which will cause the elevation of colored signal members, such for instance as colored translucent sleeves, and which will automatically light the electric lamps associated with these signal members.

Further objects are to provide means whereby the various members of the flexible connecting strands may be readily joined to adapt the device for any type of car and permit the ready taking up of the flexible members when desired.

Further objects are to provide a signal system for automobiles which is ornamental in appearance and enhances the appearance of the car to which it is attached, and which is of strong and substantial construction and substantially fool proof.

An embodiment of the invention is shown in the accompanying drawings, in which:—

Figure 1 is a plan view showing the position of the parts and showing the automobile in dotted lines.

Figure 2 is a vertical sectional view through one of the signal members.

Figure 3 is a view of the switch box attached to the dash showing the box with the cover removed.

Figure 4 is a transverse sectional view on the line 4—4 of Figure 3.

Figure 5 is a similar view on the line 5—5 of Figure 3.

Figure 6 is a view of one of the connectors, such view being partly in section.

Figure 7 is a diagrammatic view of the wiring system.

Referring particularly to Figure 1 of the drawings, it will be seen that the system comprises essentially a control box or switch box 1 which is attached to the dash and which is connected by means of flexible members and electrical circuits with a pair of right hand signal members 2 and 3, and a pair of left hand signal members 4 and 5.

It is to be noted from Figure 1 that the members are arranged at the front and rear of the automobile and that the members 2 and 3 act simultaneously and that the members 4 and 5 are similarly designed for simultaneous action, such members being controlled, respectively, by the knobs 6 and 7 of the control box or switch box 1.

Referring particularly to Figure 3, it is to be noted that the switch box, indicated generally at 1 in the drawings, comprises a bottom portion 8 equipped with a removable cover 9, such cover being held in place by means of screws and suitable lugs, as illustrated. The body portion or bottom portion of the box is provided with a front flange 10 which is secured to the dash 11 in any suitable manner, the operating knobs 6 and 7 projecting outwardly from the flange 10 and presenting a finished appearance. These operating knobs are rigidly secured to rods 12 and 13, respectively, which in turn are rigidly secured to cross heads 14 and 15. These cross heads may be made of metal, if desired, and rigidly carry insulating members 16. These insulating members carry the switch plungers 17 and 18 which are provided with spherical ends associated with a contracted neck 19.

It is to be noted further that the cross heads are provided with set screws 20 which lock the cables or flexible members 21 to such cross heads, two of such cables being provided for each cross head. These cables are carried in flexible sheaths 22 of well known construction, such sheaths being preferably clamped by means of a binding strip 23 secured to the rear end of the body portion 1 of the box, as shown in Figure 3.

The forward portion of the box carries an insulating block 24 which is provided with apertures 25 therethrough adapted to permit the free passage of the switch plungers 17 and 18. These switch plungers are adapted to respectively bridge the gap between the stationary spring contact fingers 26 and 27, such fingers being arranged in pairs on the forward side of the insulating block 24 and being provided with bowed portions adapted to grip the contracted necks 19 of the plungers. A convenient and satisfactory way of carrying these spring fingers is by means of bolts 28 which pass through the insulating block and through the feet of the stationary contacts, as shown in Figure 3. One of the bolts 28 for each pair of fingers, contacts with the head 29 of a vertical bolt 30 and such contact is readily secured by sinking the head of the bolt 30, as shown in Figure 5, downwardly into the insulating block 34. The lower end of each of the bolts 30 are provided with suitable connecting nuts for receiving the conductors hereinafter described. A third bolt 31 is provided, as shown in Figures 3 and 5, and is connected to a lip 32 common to the two inside spring fingers, as shown in Figure 3.

In order to insure the accurate aligning of the plungers 17 and 18 with their apertures 25 through the insulating block 24, a longitudinal guide strip 33 (see Figures 3 and 4) is rigidly carried between the insulating block 24 and the rear portion of the box 1. This guide strip may be relatively thin, as shown in Figures 4 and 5, and fits within slots formed in the cross heads 14 and 15. This prevents rotation of the cross heads and insures the aligning of the plungers 17 and 18 with their apertures 25.

The four signal devices 2, 3, 4 and 5 are of identical construction. One of the devices, for instance, the signal device 2 is shown in detail in Figure 2. It comprises a metallic upstanding outer shell 34 provided with a flanged base 35 adapted for attachment to a suitable portion of the automobile. This base 35 is provided with an aperture within which the sheath 22 of the flexible cable 21 is received. The cable is held in position by means of a clip 36 secured to the base 35 and provided with clamping ears 37 which are drawn tight about the end of the sheath 22 and thus retains the sheath in position. The base 35 supports an upstanding centrally positioned pillar or post 38 which, at its upper end, is provided with a socket adapted to receive an electric lamp 39. Further, the base carries a small rod 40 about which a helical spring 41 is loosely positioned. The upper end of this spring bears against a washer retained by a screw 42 carried by the upper end of the rod 40.

A relatively short metallic sleeve 42' is slidably positioned within the shell 34 and is provided with a bottom apertured flange 43. This flange is apertured corresponding to the aperture in the base 35 and is also apertured to slidably receive the post 40. The lower end of the helical spring 41 bears against this bottom flange 43. It is to be noted from Figure 2 that the flange 43 of the slidable metallic sleeve is provided with an upturned ear 44 to which the end of the cable 21 is attached. The cable is passed over a bottom pulley 45 preferably supported from the base 35 and over an upper pulley 46 which may conveniently be carried by the central pillar 38. Thus, when the cable 21 is retracted the metallic sleeve 42' slides upwardly against the action of the spring 41. This metallic sleeve carries a translucent colored sleeve or signal member 47, as shown in Figure 2, and such signal member is adapted to be slid upwardly and to project above the upper end of the metallic shell 34. A glass protecting cap 48 is provided for the upper end of the apparatus and is preferably elongated to accommodate the translucent sleeve 47 when in its elevated position. Both the upper end of the member 48 and the sleeve 47 are rounded to enhance the appearance of the apparatus. A convenient way of retaining the member 48 in position is to provide a relatively heavy bottom flange 49 thereon and to retain the flange by means of a suitable clamping nut 50 screwed on the enlarged upper end of the sleeve 34. If desired, a reflector 51 may be carried by the outer side of the shell 34, such reflector being of the usual type consisting of a transparent red member commonly known as a stone and adapted to be lighted when an outside light is flashed upon it.

In order to provide an easy means of joining the ends of the cables 21, which extend from the control box 1 to the signals, with the cables which extend inwardly from the signals, a special form of connector is provided. This member is illustrated in Figure 6 from which it will be seen that it comprises an elongated tube 52. One end of the tube is provided with a threaded apertured plug 53 which receives one of the sheaths 22, the other end of the plug carries a flanged connecting member 54 which is externally threaded and is held in place by means of a nut 55. This member 54 receives the other end of the flexible sheath 22. The cables 21 extend inwardly of the device and are either knotted or otherwise provided with enlarged heads 56. These heads are joined by means of a fitting which consists of a cup-shaped member 57 cooperating with a threaded plug 58, both the plug and the cup-shaped member being apertured to receive the cables.

Thus, it is readily apparent that the desired adjustment of the cables may be most easily secured by forming the enlarged heads 56 at appropriate points either by knotting the cables or in any suitable manner, and thereafter joining them by the fittings described and illustrated in Figure 6.

The electrical system for the lamps 39 comprises the spring fingers 26 and 27 previously described. The inner fingers are connected to a common conductor 59 which is connected to one end of the battery 60 through a manually controlled switch 61, the other end of the battery being grounded in accordance with the usual practise. The outer fingers of the two pairs 26 and 27 are connected by means of conductors 62 and 63 with the forwardly and rearwardly extending trunk lines 64 and 65. These trunk lines or conductors lead through the lamps 39 in the signal devices and from thence pass to the ground, it, of course, being understood that the ground, as used in this case, refers to the frame work of the automobile.

It is to be noted that the right hand forward lamp and the right hand rear lamp are connected by means of the conductors 64 and similarly the left hand forward and rear lamps are connected by means of the conductor 65.

In operating the device, it is merely necessary for the driver to withdraw the correct plungers 6 or 7. Assuming that he has withdrawn the plunger 6, such withdrawal will move the switch plunger 17 between the pair of fingers 26 and thus close the circuit from the battery through such fingers along conductor 62 through conductor 64 to the right hand pair of lamps 39 and thence by way of the frame work of the machine to the battery. These lamps will thus be lighted. At the same time the appropriate cables 21 are retracted and the sleeves 47 corresponding to the signal members 2 and 3, are elevated and are positioned outside of the corresponding lamps. Thus the desired signal is given and the requisite color is displayed.

It has been found extremely satisfactory to employ a green translucent member for the sleeves of the signals 2 and 3 on the right hand side of the machine and to employ an orange translucent member for the signals 4 and 5 on the left hand side of the machine.

When it is desired to display the signals without illuminating the device, as for instance when the apparatus is used in daylight driving, it is merely necessary to open the switch 61, the parts then operate in the manner previously described without, however, energizing the electric lamps 39.

It is to be noted that the springs 41 (see Figure 2), retract the translucent sleeves 47 and, tension the cables 21, thus retracting the knobs 6 and 7. However, there is sufficient grip between the spring fingers 26 and 27 and the contracted necks 19 of the plungers 17 and 18 to hold the parts in extended position until the driver initiates the retracting movement by pressing the appropriate knob.

It is to be understood that if it is desired to make a full stop that both of the plungers are simultaneously retracted and all of the signals are simultaneously operated. This gives a very positive indication of the driver's intention and the signals are clearly visible from both ends of the machine.

It is, of course, to be understood that various changes may be made as desired in the details of construction, and in the arrangement of the parts without departing from the spirit of this invention. For instance, other colors may be employed for the signal members if it is found expedient and also, although connectors such as illustrated in Figure 5 have been shown as applied only to the forward cables, they may, nevertheless, be equally well applied to the rear cables.

It is, therefore, to be understood that although the invention has been described in considerable detail, that the description and illustration are to be interpreted only as illustrative matter showing one embodiment of the invention and that the invention is to be limited only as claimed.

I claim:

A signal device for an automobile comprising a stationary metallic shell adapted for attachment to the automobile, a transparent elongated cap for said shell, an upright pillar mounted within said shell, an electric lamp carried by the upper end of said pillar and located within the transparent cap, a short slidable metallic sleeve mounted within said shell, a translucent colored sleeve carried by said slidable sleeve, resilient means urging said slidable sleeve and said translucent sleeve towards hidden position within said shell, a flexible cable connected to said slidable sleeve and extending upwardly within said shell, a pulley carried by said pillar at an elevated point within said shell, said cable passing over said pulley and extending downwardly through the bottom of said shell, and means for guiding said cable outwardly from the bottom of said shell.

In testimony that I claim the foregoing I have hereunto set my hand at Racine, in the county of Racine and State of Wisconsin.

VLADISLAV ALTMAN.